United States Patent [19]
Kaufman, Jr. et al.

[11] 3,774,003
[45] Nov. 20, 1973

[54] ADJUSTABLE END TRAPS
[75] Inventors: Harold B. Kaufman, Jr., New York; Howard Roth, Bronx, both of N.Y.
[73] Assignee: DCA Food Industries Inc., New York, N.Y.
[22] Filed: July 27, 1971
[21] Appl. No.: 166,539

[52] U.S. Cl. ............................... 219/10.55, 99/404
[51] Int. Cl. ............................................. H05b 9/06
[58] Field of Search................... 219/10.55; 333/12, 333/81 B; 174/35 MS; 99/221, 404; 118/620

[56] References Cited
UNITED STATES PATENTS
| | | | |
|---|---|---|---|
| 3,427,171 | 2/1969 | Jeppson | 99/221 |
| 2,656,518 | 10/1953 | Good | 333/81 B |
| 3,050,606 | 8/1962 | Tibbs | 99/221 |
| 2,898,562 | 8/1959 | Trevor, Jr. | 333/81 B |
| 3,321,314 | 5/1967 | Jeppson | 99/221 |

*Primary Examiner*—Leon G. Machlin
*Attorney*—Morton Amster et al.

[57] ABSTRACT

An end trap for preventing the escape of microwave energy in a microwave fryer having a conveyor passing through an open port is adapted to control the penetration of the microwave field within the trap for adjusting critical cooking parameters. The penetration of the microwave field within the trap is regulated by a longitudinally variable metallic surface extending across the conveyor within the trap at a height above the frying fat surface which is less than one-half the wave length of the energy at which the oven is operated.

6 Claims, 16 Drawing Figures

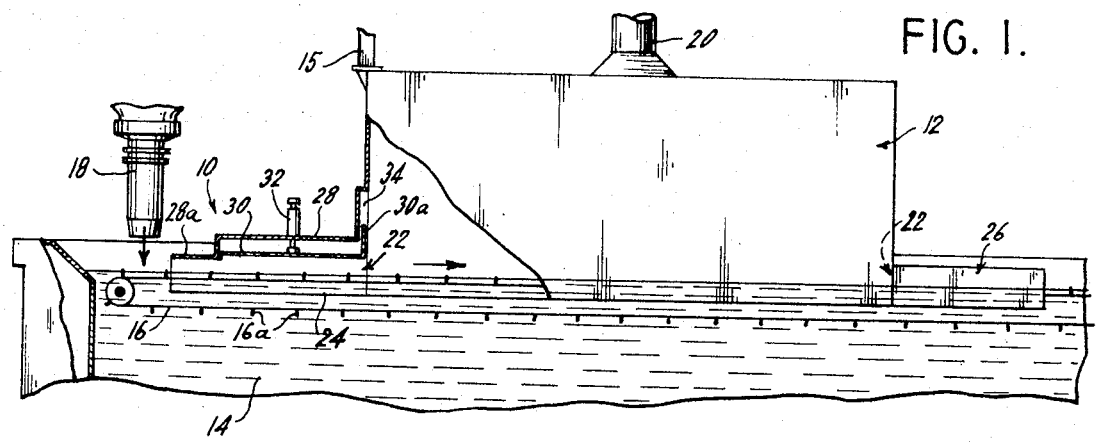
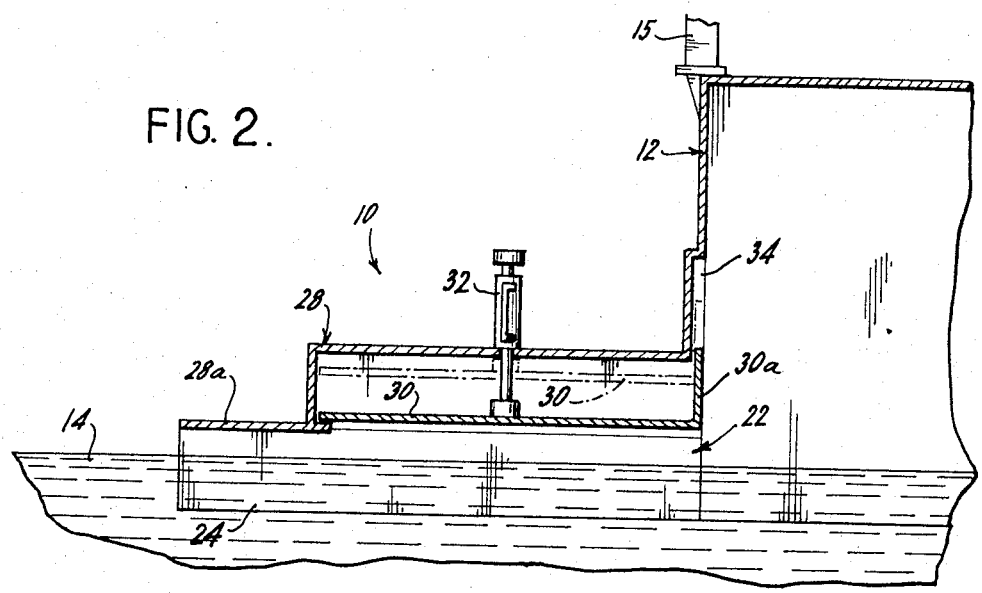
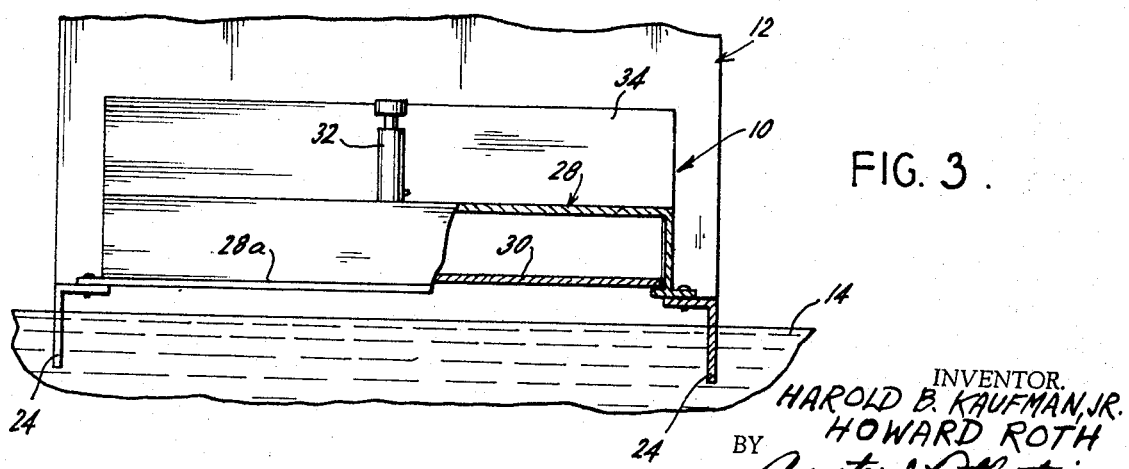

PATENTED NOV 20 1973 3,774,003

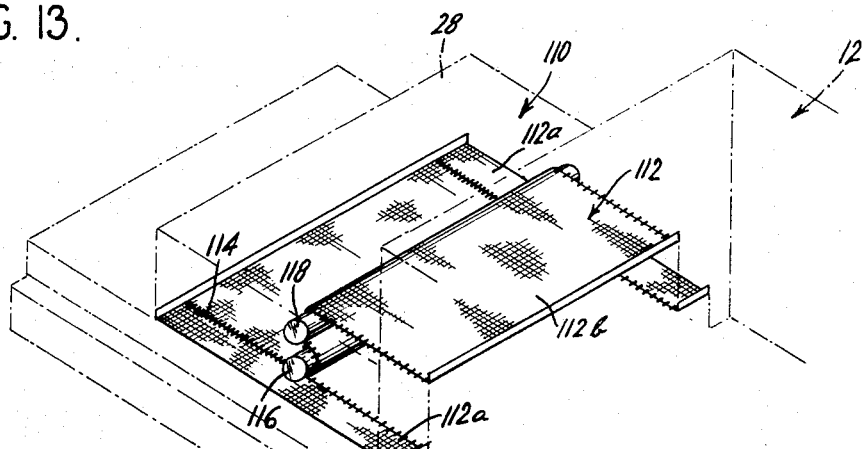
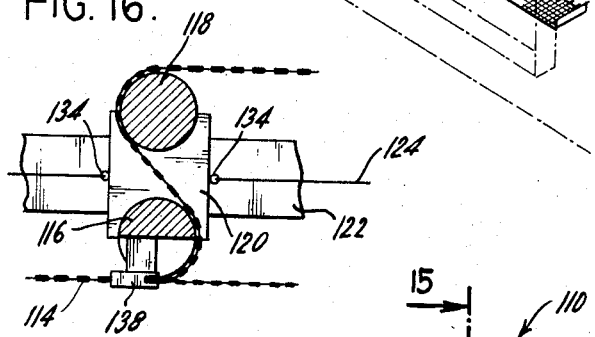
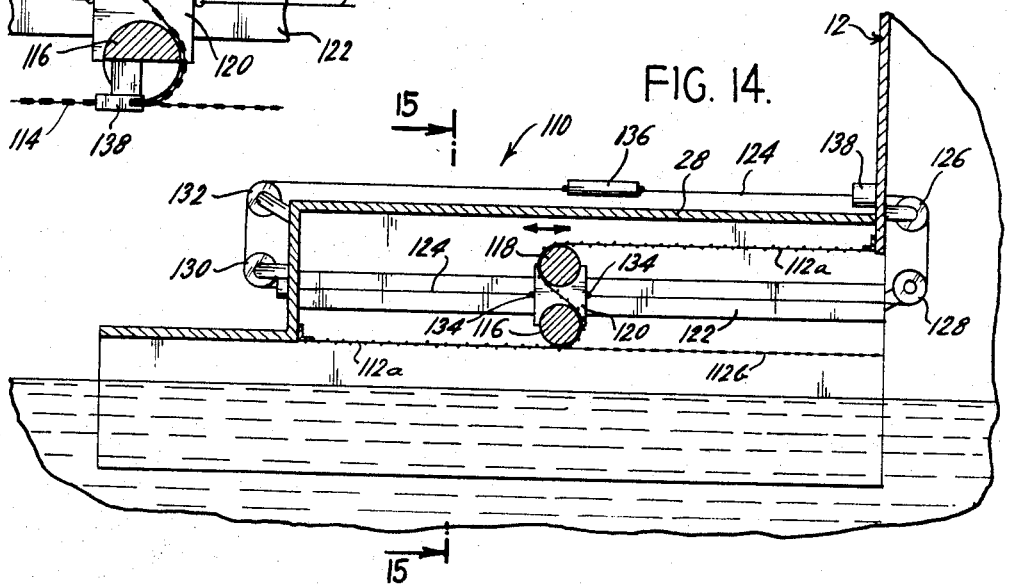
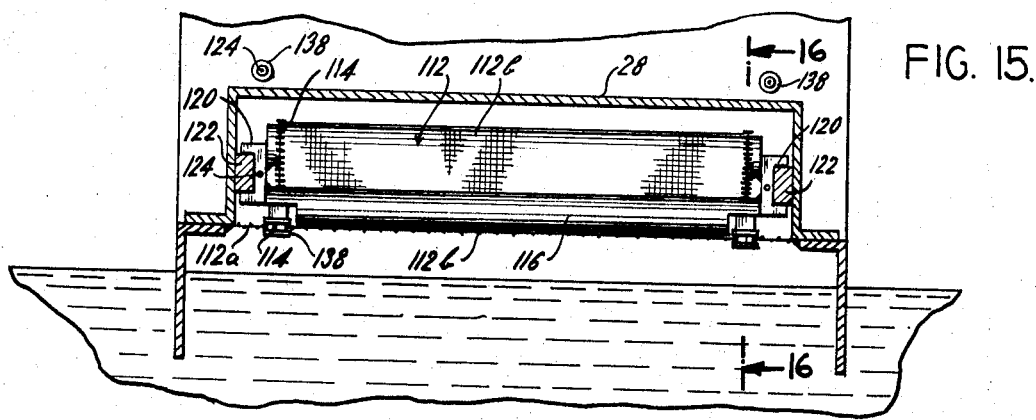

ADJUSTABLE END TRAPS

This invention relates generally to microwave cooking equipment and more specifically to an adjustable end trap for use in conjunction with commercial microwave fryers and the like for permitting efficient adjustment of cooking parameters.

In commercial microwave frying equipment, products to be fried are dropped over a conveyor which is partially submerged in a liquid fat reservoir and are carried by the conveyor through an enclosed microwave chamber where they are exposed to microwave energy. The critical parameters of microwave frying are the microwave frying time (the time during which the product is actually exposed to microwave energy), the intensity of microwave energy to which the product is exposed, and the "feed time" (the interval of frying between the time the product is dropped into the fat and the time it is first exposed to microwave field). When the products being fried are transferred to a conveyor, the microwave frying time is the time it takes the conveyor to traverse the distance from the entrance port of the microwave chamber to the exit port. The feed time is determined by the distance between the extrusion nozzle or cutter which drops the product onto the conveyor and the entrance port of the oven.

For proper frying, the three parameters referred to above must be selected in accordance with the heat energy equivalents of the product being fried. These three frying parameters are generally determined empirically for each product.

In prior art microwave fryers, it is impossible to balance the feed time, microwave frying time, and microwave intensity. Since the conveyor transfers products through all stages of the fryer system at a uniform rate, the feed time cannot be reduced by increasing the conveyor speed without also reducing the microwave frying time. If frying time is reduced for a given product, the intensity of the microwave field must be increased to compensate. However, increased microwave level consumes substantial power and, even by such compensation, it is not possible to obtain the proper balance between microwave intensity and duration of exposure required to properly form the fried product.

Applicants' have found that any desired frying parameters can be established by providing the oven with a specially designed end trap which permits an operator to control the penetration of the microwave field within the trap so as to adjust the distance between the cutter and the beginning of the microwave field and hence adjust the feed time during continuous frying.

The conventional purpose and function of end traps are described in our co-pending application Ser. No. 51,531. Briefly stated, an end trap consists of a tunnel through which the conveyor passes when entering and leaving the microwave oven. A metallic or other microwave reflecting surface is positioned within the tunnel at a height above the fat surface selected to be less than one-half the wave length of the microwave energy used in the oven so that, in accordance with well known microwave principles, dangerous quantities of microwave energy cannot be transmitted to the environment from the infeed and outfeed ports (which must be kept open to accommodate the continuous conveyor).

Applicants' unique end-trap includes movable members arranged to permit variation of the microwave exposure time in front of the infeed port of the microwave cavity within the end trap. Applicants' trap permits an operator to bring the microwave field closer to the extruder without interfering with the installation of conventional cutting equipment and to vary the total length of the microwave field, thereby in effect permitting reduction of the feed time and an increase in the microwave cooking time.

It is thus an object of the present invention to provide an improved microwave fryer having an improved end trap.

It is a further object of the invention to permit convenient adjustment of the cooking parameters in a microwave fryer so as to permit an efficient balance between feed time, microwave frying time and microwave intensity.

It is a further object of the invention to permit extension of the microwave field in a microwave fryer without interfering with the installation of conventional doughnut cutting equipment at the normal location on the fryer.

In accomplishing these and other objects and in accordance with the present invention, applicants' end trap comprises a tunnel enclosure disposed around the input port of a microwave chamber including an adjustable surface of microwave reflecting material extending across the tunnel external to the input port. In the fryer, the adjustable conducting surface is positioned above the fat surface by a distance less than one-half of the wave length of the energy at which the oven is being operated. By adjusting the position and/or extent of the reflecting surface within the end trap, the penetration of the microwave field within the end trap and hence the distance between the extruder or cutter and the microwave field is controlled to provide the desired cooking parameters.

Further objects, features and advantages of the present invention will be apparent from the following detailed description of preferred but nonetheless illustrative embodiments in accordance with the present invention, when taken in conjunction with the appended drawings wherein:

FIG. 1 is a side elevation partially broken away of a first embodiment of applicants' adjustable end trap in position on a microwave fryer;

FIG. 2 is an enlarged cross-sectional view of the first embodiment of applicants' adjustable end trap;

FIG. 3 is an end view of the first embodiment, partially broken away;

FIG. 13 is a perspective, representational view of a fifth embodiment of applicants' adjustable end trap;

FIG. 14 is a cross-sectional view of the fifth embodiment;

FIG. 15 is a cross-sectional view taken along line 15—15 in FIG. 14; and

FIG. 16 is an enlarged view of the zipper mechanism taken along line 16—16 in FIG. 15.

Figure 4:
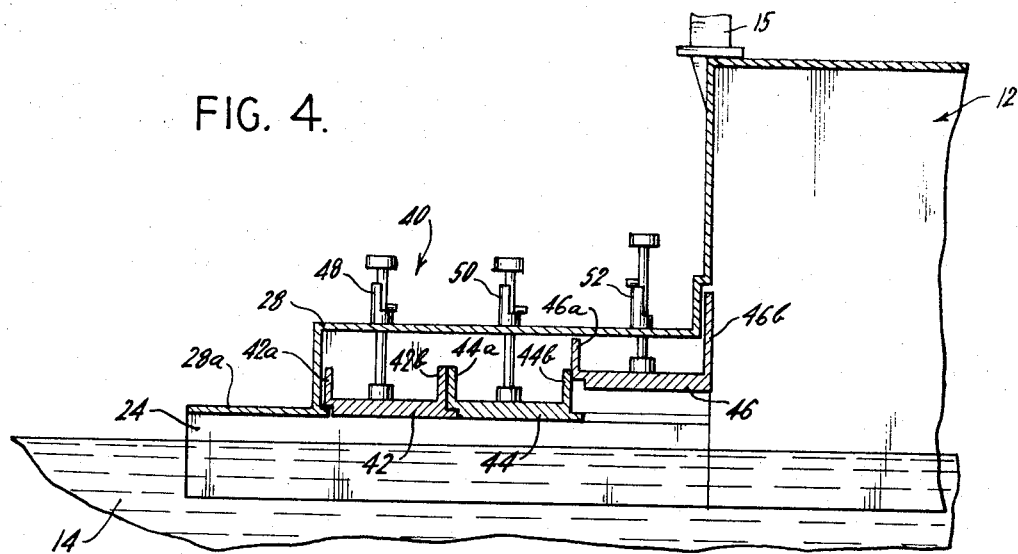
FIG. 4 is a cross-sectional view of a second embodiment of applicants' adjustable end trap.

The fryer of FIG. 1 is particularly adapted for the manufacture of fried doughnuts and consists of a microwave enclosure or cavity 12 positioned over a liquid fat reservoir 14. A conveyor belt 16 is provided to carry the products to be fried from extrusion nozzle 18, through the microwave enclosure 12 to the next station in the process (not shown). Extrusion nozzle or cutter 18 is of a type well known in the doughnut manufacturing art and is adapted to extrude and cut raw doughnut dough in doughnut form and drop the raw doughnuts into pockets formed by ridges 16a on conveyor 16 at the surface of fat reservoir 14.

Enclosure 12 is of a type well known in the art and includes a wave guide input 15 for microwave energy and a vent port 20.

To permit the passage of conveyor 16 through enclosure 12, the enclosure includes input and output ports 22, and input and output end traps 10 and 26 respectively. The output end trap 26 is of conventional design and is adapted to prevent microwave energy from escaping from the open output port.

Input trap 10 (shown in FIGS. 1, 2 and 3) comprises a tunnel enclosure 28 extending over conveyor 16 with side pieces 24 depending into fat reservoir 14. At the input side of the end trap 28a, the top of the tunnel enclosure 28 is located at a distance above the fat surface which is less than one-half the wave length of the microwave energy used in microwave enclosure 12. The height of the tunnel 28 above the frying fat, between section 28a and the oven is greater than one-half the wave length of the microwave energy employed in the fryer. Applicants' novel input end trap is provided with a movable microwave reflecting plate 30 which moves between a lower position less than one-half a wave length above the fat in reservoir 14 (shown in solid line in FIG. 2) and an elevated position greater than one-half wave length above reservoir 14 (shown in broken line in FIG. 2). A slide support 32 supports plate 30 at either its lower or upper position in a well known manner.

When in its lower position, plate 30 and tunnel top section 28a constitute a unitary reflecting surface. In accordance with known microwave principles, dangerous quantities of microwave energy will not pass beneath this reflecting surface and hence will not enter the region beneath plate 30, nor escape from the input port. Note that plate 30 includes an upward extending flange 30a adapted to be received in channel 34 of the cavity so that when in its lower position, 30a covers the space between plate 30 and the tunnel top 28.

When in its upper position with stop 30a received within slot 34, microwave energy enters end trap 10 and penetrates the trap up to the interior edge of lower tunnel top section 28a. It has been found that the intensity of microwave energy in this portion of the end trap is very nearly the same as the energy in microwave enclosure 12 and contributes to frying the doughnut as soon as the doughnut enters this region.

By raising or lowering plate 30, the distance between the beginning of the microwave field and the extrusion nozzle 18 may be varied, varying the effective feed time. At the same time, microwave cooking of the doughnut begins earlier by virtue of the additional extent of the microwave field. By appropriate variation of power levels, this first embodiment of applicants' invention may be employed to establish cooking parameters for several different product sizes.

Figure 5:
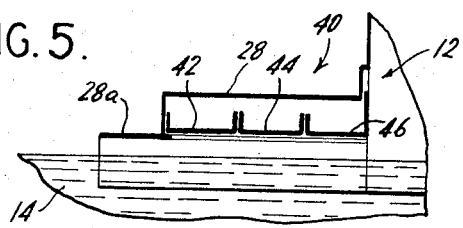
FIG. 5 is a schematic representation of the second embodiment adjusted to provide the longest feed time.
Figure 6:
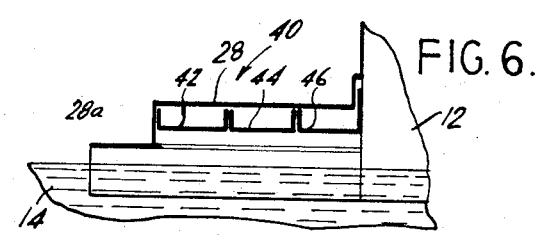
FIG. 6 is a representational view of the second embodiment adjusted to provide the shortest feed time.

FIGS. 4, 5 and 6 show a second embodiment 40 of applicants' invention which is similar to the first embodiment except that plate 30 in FIGS. 1-3 has been replaced by three separate plates 42, 44 and 46. Each plate is independently movable between lower and upper positions by slides 48, 50 and 52 as in the first embodiment. Adjacent edges of plates 42, 44 and 46 include upward extending stop plates 42a, 42b, 44a, 44b, 46a, 46b which close off the area over the remaining plates when one or more are in the upper position.

FIGS. 5 and 6 are representational views of this second embodiment with the individual plates in their total lowered position (FIG. 5) and total raised position (FIG. 6).

It will be appreciated that this second embodiment permits four different settings of the distance between an extruder nozzle (not shown in FIG. 4) and commencement of the microwave field. This permits an operator to more carefully and accurately control the microwave frying time in the frying operation.

Figure 7:
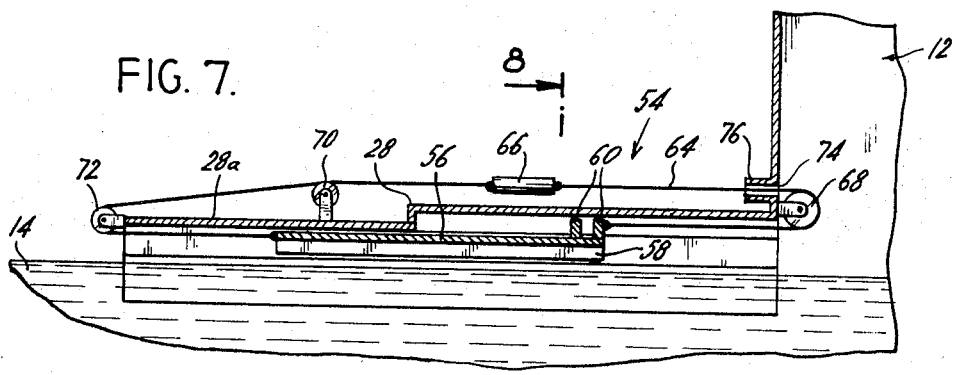
FIG. 7 is a cross-sectional view of a third embodiment.
Figure 8:
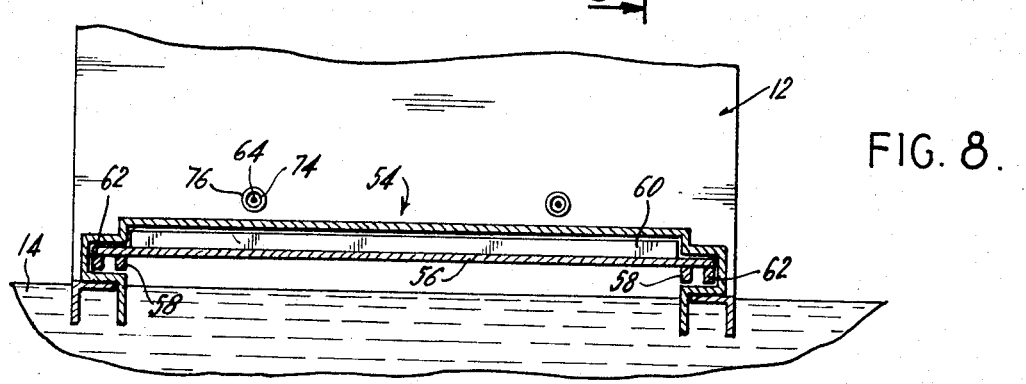
FIG. 8 is an end view of the third embodiment.

FIGS. 7 and 8 show a continuously adjustable input end trap 54 in accordance with a third embodiment of applicants' invention. As in the other embodiments, end trap tunnel 28 includes a lower tunnel section 28a away from oven 12 and an upper tunnel section between section 28a and the oven. In this embodiment, a slidable conducting plate 56 is positioned across the conveyor to ride within channels 58 at opposite sides of the tunnel enclosure. Plate 56 includes a pair of transverse, upwardly extending conductive strips 60 which form a microwave choke of a type well known in the art (and described in our prior applications) to prevent microwave energy from entering the region over plate 56. Plate 56 also includes two pairs of parallel depending conductive strips 62 along its outer edges within channels 58. Strips 62 act as microwave chokes to prevent the escape of microwave energy around plate 56. The height and separation of strips 60 and 62 are selected for proper microwave choke action as described in our prior applications.

A wire and pulley system is provided to slide plate 56 forward and away from oven 12 in an obvious manner. The system includes lines 64, handles 66 and pulleys 68, 70 and 72. Apertures 74 in the side wall of cavity 12 where wires pass through the wall includes an extending flange 76 of conductive material to prevent microwave energy from escaping through the apertures. It will be appreciated that by moving handles 66 away from the oven, plate 56 is brought closer to the oven, thus decreasing the penetration of the microwave field within the end trap. This third embodiment permits a continuous variation of the penetration of the microwave field into the end trap and thus provides even greater flexibility than the prior embodiments.

Figure 9:
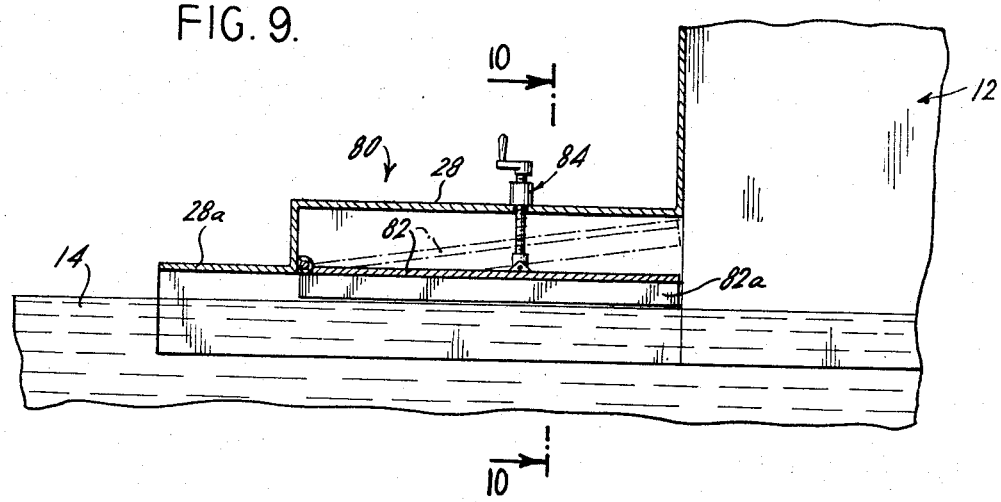
FIG. 9 is a cross-sectional view of a fourth embodiment of applicants' end trap.
Figure 10:
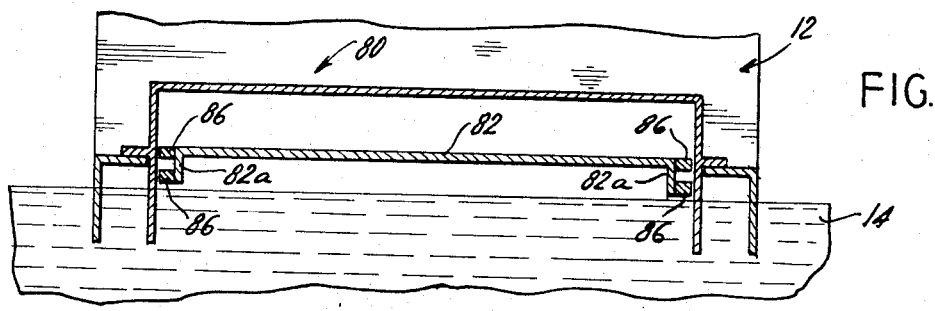
FIG. 10 is a cross-sectional view taken along line 10—10 in FIG. 9.

FIGS. 9 and 10 show a fourth embodiment 80 of applicants' adjustable end trap wherein a movable conducting plate 82 is pivoted at lower tunnel portion 28a. A crank and thread mechanism 84 is provided to pivot plate 82 into selected angled raised positions. In its lowermost position (shown in solid line in FIG. 9), plate 82 is at a height above the surface of fat in fat reservoir 14 which is less than one-half the wave length of the microwave energy in oven 12. By rotating crank 84, plate 82 is pivoted upward so that microwave energy is permitted to enter the space beneath the plate. As plate 82 is pivoted in a counterclockwise direction, the penetration of microwave energy into tunnel 28 is increased, bringing the microwave field closer to the extrusion nozzle (not shown). Plate 82 includes depending side members 82a each having a spaced pair of conductive strips 86 forming a microwave choke serving to prevent microwave energy from escaping from above plate 82 when in a lowered position.

It will be appreciated that the cut off point of the microwave field in end trap 80 is not as sharp as in the other embodiments of applicants' invention. However, end trap 80 may be empirically adjusted to produce the desired feed time and minimum cooking time.

Figure 11:
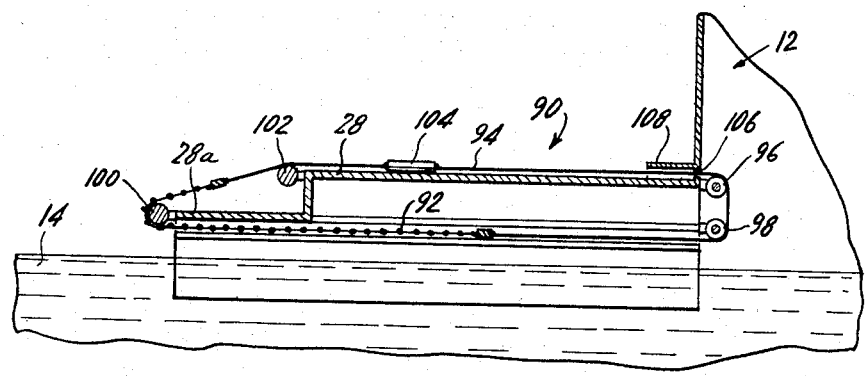
FIG. 11 is a cross-sectional view of a variation of the third embodiment of applicants' adjustable end trap.
Figure 12:
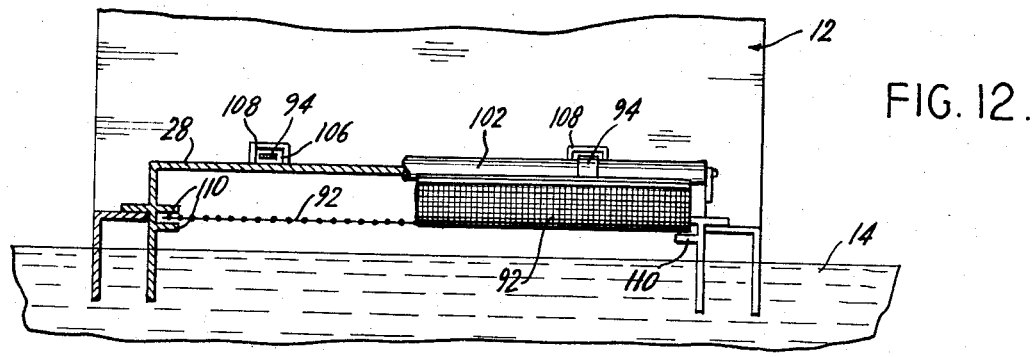
FIG. 12 is an end view, partially in section of the embodiment of FIG. 11.

FIGS. 11 and 12 show an end trap 90 in accordance with a variation of the third embodiment of applicants' invention. In trap 90, tunnel 28 includes a variable conducting surface in the form of a flexible screen 92. Flexible screen 92 is maintained taught by a band and pulley arrangement including bands 94 each of which is secured at its opposite ends to opposite ends of screen 92. Screen 92 and bands 94 comprise an endless loop about pulleys 96, 98 and rods 100, 102 with a handle 104 positioned above the top of tunnel 28. The reach of screen 92 into tunnel 28 may be adjusted by moving handle 104 toward and away from oven 12. Apertures 106 are provided in the wall of oven 12 to permit bands 94 to enter the oven. Conductive sleeves 108 are formed about each of these apertures to prevent the escape of microwave energy.

Tunnel 28 (FIG. 12) includes a pair of side guide channels 110 along the interior side walls of the tunnel to receive screen 92 and form a microwave choke to prevent microwave energy from escaping between the screen 92 and the side wall of tunnel 28.

End trap 80 permits continuous variation of the distance between conductive surface 92 and the input port to control the penetration of microwave energy within the end trap on a continuous basis. It permits the conducting surface to be moved further from oven 12 than in the embodiment of FIGS. 7–8.

FIGS. 13–16 show an adjustable end trap 110 which constitutes a fifth embodiment of applicants' invention. Trap 110 includes a variable conducting surface comprising a screen or similar piece of flexible conductive sheet material 112 rigidly supported across tunnel 28. The lateral edges 112a of sheet 112 are secured to the depending walls of tunnel 28 above the surface of reservoir 14 by a distance less than one-half wave length of the energy used in oven 12. A central portion 112b of screen 112 is connected to the lateral edge portions 112a of the screen by a pair of zippers 114 which run along the length of the screen substantially from end to end thereof. Central portion 112b is separated into lower and upper sections by a pair of transverse rods 116, 118 — the portion of central screen section 112b on the side of rods 116, 118 away from oven 12 is in the same plane as edges 112a. The portion of central section 112b on the side of rods 116, 118 adjacent oven 12 is maintained at a height above the surface of reservoir 14 greater than one-half the wave length of the microwave energy employed in the oven.

Rods 116, 118 are supported on a mounting carriage 120 adapted to slide on side guides 122 on the interior surface of the sidewalls of tunnel 28 (see FIG. 15) toward and away from oven 12. A pair of guide wires 124 form a continuous loop about pulleys 126, 128, 130 and 132 and are each secured to mounting rings 134 at opposite sides of carriage 120. Handle 136 is provided to permit an operator to slide carriage 120 toward and away from oven 12 in an obvious manner. As in prior embodiments, a flange 138 extrudes outwardly from an input face of oven 12 about the opening where wire 124 enters the oven.

A pair of zipper closing mechanisms 138 are provided at the lower edge of rod 116 on zippers 114. Closing mechanisms 138 operate in conventional zipper fashion to connect the edge and central portions(112a and 112b respectively) as carriage 120 moves toward oven 12. Central screen portion 112b passes under and upwardly around rod 116, between rods 116 and 118 and over rod 118 and is adapted to slide freely over the surface of the rods.

By moving handle 136 away from oven 12, carriage 120 is drawn towards oven 12 extending the lower portion of screen central section 102b toward the input port of the oven. In accordance with well-known microwave principles previously described, microwave energy from oven 12 penetrates end trap 110 up to the position of carriage 120 but will not penetrate beneath 112a or the lowered portion of central screen section 112b on the side of carriage 120 away from the oven. By adjusting the position of carriage 120, the penetration of microwave energy in end trap 110 can be varied, varying the feed time and microwave cooking time of products being fried.

It is to be understood that the above-described embodiments are merely examples of the application of the principles of applicants' invention. Numerous additional embodiments will be apparent to those skilled in the art without departing from the spirit or scope of the present invention as defined in the following claims.

What is claimed is:

1. An end trap for a microwave cavity having an open port through which a conveyor moves comprising a tunnel enclosure attached to the exterior of said cavity and disposed around said port such that said conveyor as it moves through said port moves through said tunnel enclosure, a fixed microwave reflecting surface extending across said tunnel at the end thereof away from said cavity, said fixed reflecting surface having a vertical clearance above the bottom of said tunnel which is less than one-half ($\frac{1}{2}$) of the wave length of the energy at which said cavity is operated, and a plurality of adjustable microwave reflecting plates located side by side between said fixed surface and said cavity, each of said adjustable reflecting plates being individually adjustable between upper and lower positions, facing edges of adjacent reflecting plates including alternate ledge and seat action, said ledge being receivable in said seat when said adjacent conducting plates are in substantially the same plane for preventing the escape of microwave energy from between adjacent plates, said adjustable plates in said lower positions having a vertical clearance above the bottom of said enclosure which is less than one-half ($\frac{1}{2}$) of the wave length of the energy at which said cavity is operated, said adjustable plates in said upper position having a vertical clearance above the bottom of said enclosure which is greater than one-half ($\frac{1}{2}$) of the wave length of the energy at which said cavity is operated, so that selective positioning of said adjustable plates varies the extent to which the microwave field penetrates into said tunnel for adjusting the point in said tunnel at which microwave cooking begins.

2. An end trap for a microwave cavity having a port through which a conveyor moves comprising a tunnel enclosure attached to the exterior of said cavity and disposed around said port such that said conveyor as it moves through said port moves through said tunnel enclosure, a flexible microwave reflecting surface extending across said tunnel above said port, said flexible surface having a lower section adjacent the end of said tunnel away from said oven and an upper section between said lower section and said oven, said lower section having a vertical clearance above the bottom of said enclosure which is less than one-half of the wave length of the energy at which said oven is operated, said upper section having a vertical clearance above the bottom of said enclosure which is greater than one-half of the wave length of the energy at which said oven is operated, and means for selectively varying the extent of said upper and lower sections whereby the penetration of microwave energy into said tunnel may be controlled.

3. Apparatus in accordance with claim 2 wherein said means for varying the extent of said upper and lower sections comprises a pair of rods extending across said tunnel in upper and lower relation to one another, the lower edge of said lower rod being in alignment with said lower section, the top of said upper rod being in alignment with said upper section, said flexible conducting surface passing over said upper rod and beneath said lower rod, with said upper and lower rods being adapted to move toward and away from said oven for selectively varying the extent of said upper and lower conducting surfaces.

4. An end trap in accordance with claim 2 wherein said lower flexible surface extends substantially across said tunnel from side to side thereof and said upper flexible surface comprises a central portion of said surface, said central portion being secured to the remainder of said flexible surface in the lower section thereof by zippers adapted to be opened by motion of said roller assembly.

5. An end trap for a microwave cavity having a port through which a conveyor moves comprising a tunnel enclosure attached to the exterior of said cavity and disposed around said port such that said conveyor as it moves through said port, moves through said enclosure, a horizontal guide track extending along the sides of said tunnel, a microwave reflecting plate extending across said tunnel at a vertical height above the bottom of said tunnel enclosure which is less than one-half (½) the wavelength of the energy at which said cavity is operated, said reflecting plate being slidably mounted in said track for movement in a horizontal direction toward and away from said cavity, and means for moving said reflecting plate toward and away from said cavity for selectively varying the penetration of microwave energy within said tunnel for controlling the point at which microwave cooking begins.

6. An end trap for a microwave cavity having a port through which a conveyor moves comprising a tunnel enclosure attached to the exterior of said cavity and disposed around said port such that said conveyor as it moves through said port, moves through said enclosure, a flexible microwave reflecting screen extending across said tunnel at a vertical height above the bottom of said tunnel enclosure which is less than one-half (½) the wavelength of the energy at which said cavity is operated, roller means for adjusting the position of said flexible microwave reflecting screen, permitting said screen to move in a horizontal direction toward and away from said cavity, and means for moving said flexible microwave reflecting screen toward and away from said cavity for selectively varying the penetration of microwave energy within said tunnel for controlling the point at which microwave cooking begins.

* * * * *